United States Patent [19]

Tuma et al.

[11] 4,096,518

[45] Jun. 20, 1978

[54] AVERAGE BEAM CURRENT LIMITER

[75] Inventors: Alois Vaclav Tuma, Schlieren, Switzerland; Leopold Albert Harwood, Bridgewater, N.J.; Willem Hendrik Groeneweg, Ottenbach, Switzerland

[73] Assignee: RCA Corporation, New York, N.Y.

[21] Appl. No.: 794,127

[22] Filed: May 5, 1977

[51] Int. Cl.² .............................................. H04N 9/16
[52] U.S. Cl. ...................................... 358/74; 358/243
[58] Field of Search ............... 358/243, 168, 169, 74, 358/39, 40

[56] References Cited

U.S. PATENT DOCUMENTS

| 3,578,903 | 5/1971 | Willis | 358/243 |
| 3,980,822 | 9/1976 | Suzuki et al. | 358/243 |

*Primary Examiner*—Richard Murray

*Attorney, Agent, or Firm*—Eugene M. Whitacre; William H. Meagher; Ronald H. Kurdyla

[57] ABSTRACT

An average beam current limiter for a kinescope responsive to video signals coupled to the kinescope via a signal transmission channel comprises a source of control signals representative of average current drawn by the kinescope. When average beam current exceeds a predetermined threshold level by an amount within a first range of beam current, a corresponding control signal is coupled to the signal transmission channel to vary the D.C. content of the video signal in a direction to limit beam current above the threshold level within the first range. When beam current exceeds the threshold level by a relatively greater amount within a second range of current, a corresponding control signal serves to vary the peak amplitude of the video signal to limit beam current within the second range.

10 Claims, 1 Drawing Figure

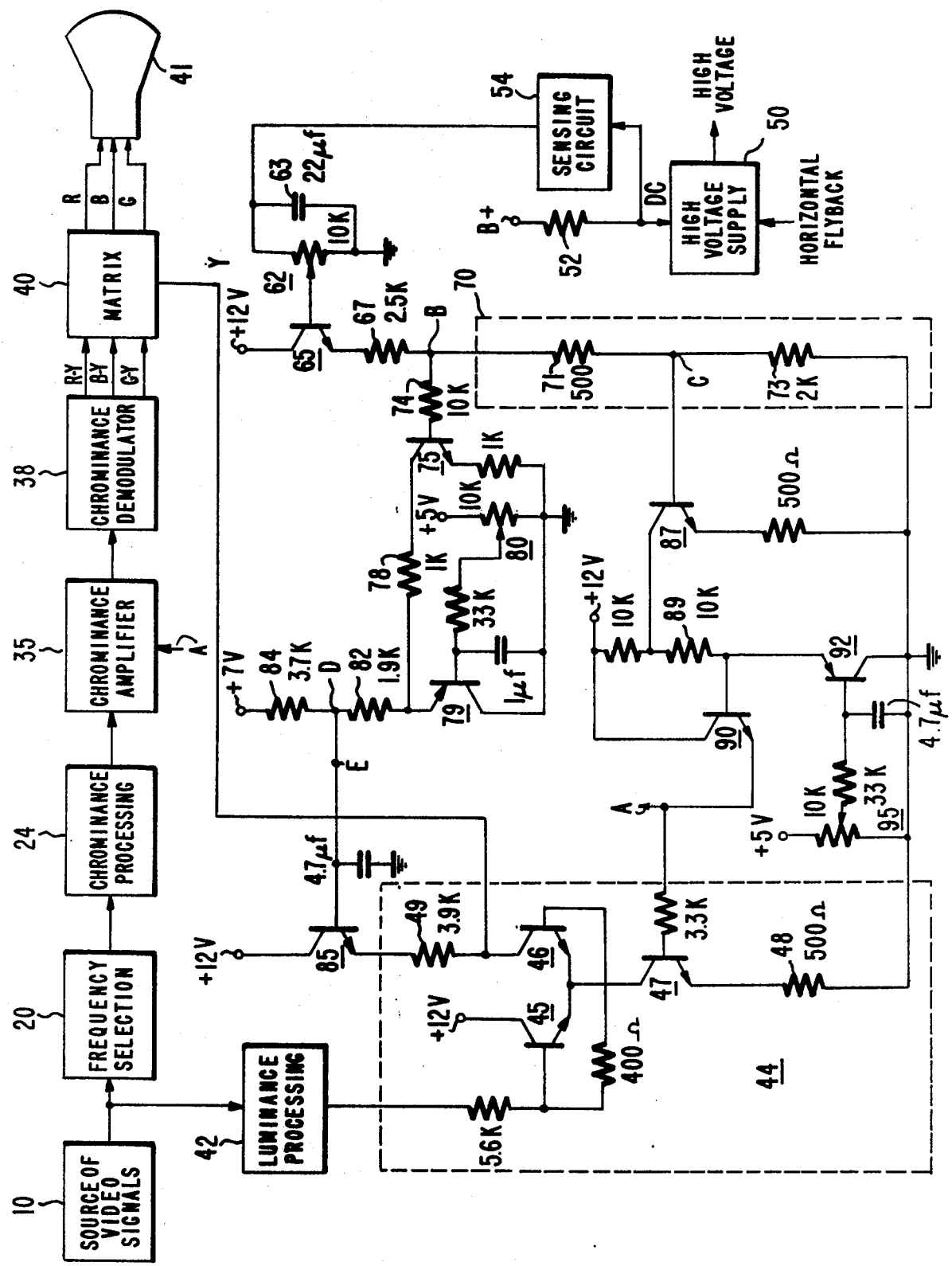

AVERAGE BEAM CURRENT LIMITER

This invention relates to apparatus for automatically limiting the electron beam current drawn by an image reproducing device, such as a kinescope of a television receiver, in response to average beam current demand of the image reproducing device.

The content of an image reproduced by a kinescope of a television receiver comprises luminance information and also chominance information in the case of a color image in a color television system. The luminance information is typically defined by the peak-to-peak amplitude of an image representative video signal, relating to image contrast, and the D.C. content of the video signal, relating to image brightness or background level. Both the peak amplitude and the D.C. content of the video signal can contribute to excessive beam currents drawn by the kinescope.

Various automatic beam current limiting systems are known which are operatively associated with brightness and contrast control functions of a television receiver. In U.S. Pat. No. 3,873,767 (Okada et al.) and 3,009,989 (Ahrons et al.), for example, the contrast and brightness control functions of a television receiver are controlled simultaneously in response to a voltage representative of beam current in excess of a desired level.

Excessive average beam currents can be caused by video signal content or adjustment by a viewer of a manual brightness control circuit often included in a luminance signal processing channel of the receiver, or both. However, excessive average beam currents are more commonly caused by misadjustment of the manual brightness control in a direction to produce increased brightness, since it is unlikely that a video signal will be transmitted with a luminance level representative of excessive brightness.

Excessive beam current may cause a receiver to produce a degraded image. More specifically, excessive beam current may cause degradation of the performance of the receiver's deflection system, electron beam spot defocussing, and picture blooming. Such high beam currents may also exceed the safe operating current capability of the kinescope, possibly causing damage to the kinescope and associated circuit components. The latter problem is compounded by the higher beam currents associated with the new-generation, high brightness kinescopes.

It is therefore desirable for an average beam current limiter to limit or oppose increases in average beam current demand above a threshold level of beam current demand by reducing image brightness, since excessive average beam currents are primarily attributable to an excessive brightness level. It is also desirable for an average beam current limiter to provide a means for opposing further increases in beam current above a second threshold level by reducing image contrast. In this manner, the relationship between image brightness and contrast will not be unduly upset, so that operation of the beam current limiter in response to such further increases in beam current will be less noticeably by a viewer. Otherwise, a reproduced image may appear to have excessive contrast during beam limiting.

It is desirable that beam current limiting apparatus for use in a color television receiver be operatively associated with both luminance and chrominance signal processing circuits to limit excessive beam current, since such beam current may be produced in response to chrominance signals as well as in response to luminance signals. For instance, excessive beam current may occur due to reproduction of a solid field of one color, which would not necessarily be accompanied by an excessive luminance signal, as well as to high brightness white image portions which are represented by high level luminance signals. Control of the amplitude of the chrominance signals concurrent with control of the amplitude of the luminance signals to limit excessive beam currents is considered advantageous, since the respective amplitudes of the luminance and chrominance signals are maintained in desired relationship. This manner of control renders the effect of beam limiting operation less noticeable and therefore less objectionable to a viewer of a displayed color image.

In accordance with the present invention, a system for processing an image representative video signal having a peak amplitude determinative of image contrast and a D.C. level determinative of image brightness includes a video signal transmission channel, and a device for reproducing an image in response to signals transmitted via the channel. Current drawn by the image reproducing device is responsive to the D.C. level and peak amplitude of the video signal. Means also are included for deriving a control signal representative of the magnitude of average current drawn by the image reproducing device. The control signal is coupled to the video signal transmission channel when the current exceeds a predetermined threshold level by an amount within a first range of current, for varying the D.C. level of the video signal in a direction to limit current above the threshold level. The control signal also is coupled to the video signal channel for varying the peak amplitude of the video signal in a direction to limit current above the threshold level when the current exceeds the threshold level by a relatively greater amount within a second range of current.

In accordance with a further feature of the invention in a system also including a chrominance channel for processing color signal components, currents within the second range are limited by varying the gain of the chrominance channel, and thereby the peak amplitude of the color signal components, simultaneously with varying the amplitude of the video signals.

The drawing is a diagram partially in block form and partially in schematic circuit diagram form of a portion of a color television receiver employing apparatus constructed in accordance with the present invention.

A source of video signals 10 provides detected composite video signals comprising luminance, chrominance, sound and synchronizing signal components. The chrominance component is coupled via a frequency selection unit 20 to a chrominance signal processing unit 24 of a chrominance channel of the receiver. Chrominance processing unit 24 may, for example, include a signal amplification stage as well as automatic color control (ACC) and automatic phase control (APC) stages. Processed signals from unit 24 are further amplified by a chrominance amplifier 35 and are supplied to a chrominance demodulator 38 for deriving R-Y, B-Y and G-Y color difference signals. The color difference signals are combined with a luminance signal Y in a matrix network 40 to produce R, B and G color representative signals. The R, B and G signals are coupled to a kinescope 41 via suitable kinescope driver stages (not shown).

A luminance signal processing unit 42 of a luminance channel of the receiver serves to amplify and otherwise process the luminance component of the composite video signal from source 10. The processed luminance signals are supplied to a luminance amplifier 44 comprising a pair of transistors 45, 46 arranged in differential amplifier configuration, and a current source including a transistor 47 and a resistor 48 for supplying operating currents to transistors 45 and 46. A load circuit for amplifier 44 comprises a common collector bias transistor 85 and a load resistor 49 arranged in a collector circuit of transistor 46. Amplified luminance signals (Y) appear at a collector electrode of transistor 46 and are coupled to matrix unit 40.

Manual adjustment of the contrast of the luminance signals is accomplished by adjustment of a contrast control potentiometer 95. For example, increased contrast is provided by adjustment of a wiper of potentiometer 95 toward an extreme upper position. This serves to increase the bias on a base electrode of a PNP transistor 92 such that the conduction of transistor 92 is reduced. The emitter voltage of transistor 92 and therefore the bias on a base electrode of an emitter follower transistor 90 then increase, which in turn causes the bias on a base electrode of transistor 47 to increase. Transistor 47 therefore conducts more heavily, whereby the gain of amplifier 44 and consequently the peak-to-peak amplitude of the luminance signals appearing at the collector of transistor 46 increase. Conversely, reduced contrast is provided by adjustment of potentiometer 95 toward an extreme lower position. In this case, the conduction of transistor 47 is lowered, causing reduced peak-to-peak amplitude of the luminance signals and thereby reduced contrast.

It is noted that a contrast control voltage appearing at a point A at an emitter of transistor 90 is also coupled to a control input of chrominance amplifier 35. This voltage thus serves also to control the gain of chrominance amplifier 35 in proportion to the amount by which the gain of luminance amplifier 44 is controlled. Thus the respective amplitudes of the luminance and chrominance signals are maintained in a desired relationship as contrast control is effected.

Manual adjustment of the brightness level of the luminance signals is accomplished via a brightness control potentiometer 80. For example, increased brightness is provided by adjustment of a wiper of potentiometer 80 toward an extreme upper position. This serves to increase the bias on a base electrode of a PNP transistor 79 such that the conduction of transistor 79 is reduced. An increased voltage then appearing at an emitter of transistor 79 is coupled to a base electrode of transistor 85 via a resistor 82, a junction point D and a point E, which results in an increased potential at the emitter of transistor 85 and consequently at the collector of transistor 46. The increased potential raises the D.C. level of the luminance signal appearing at the collector of transistor 46, causing a proportional increase in the brightness of a reproduced image. Conversely, the D.C. level of the luminance signal and therefore image brightness are reduced when potentiometer 80 is adjusted toward the extreme lower position.

A high voltage supply (e.g., a voltage tripler) generates high operating voltages for ultor and focus electrodes of the kinescope. Periodic horizontal flyback pulses developed during horizontal image retrace intervals are supplied from deflection circuits of the receiver (not shown) to an input of high voltage supply 50. A source of current including an operating supply voltage B+ and a current determining resistor 52 is coupled to a D.C. input of supply 50. Currents flowing into the D.C. input of supply 50 are representative of the beam current demand of the kinescope.

A voltage representative of the average beam current demand is provided via sensing circuit 54, an average responding filter capacitor 63 and a pre-set potentiometer 62. Sensing circuit 54 may comprise any suitable circuit arrangement for sensing the magnitude of beam current demand as manifested by the current supplied to the D.C. input of supply 50. For example, sensing circuit 54 may comprise a suitably biased common emitter transistor having a base electrode coupled to the junction of resistor 52 and the D.C. input of supply 50, and an output collector load network coupled to capacitor 63 and potentiometer 67. In such case, increasing beam current represented by current supplied to the D.C. input of supply 50 would serve to reduce the base bias of the transistor, thereby raising the collector voltage of the transistor and the voltage developed across potentiometer 62.

The beam current representative voltage appearing at the pre-set wiper of potentiometer 62 is coupled via a base-emitter junction of a common collector transistor 65 and a resistor 67, to an input point B of a voltage divider 70 comprising series resistors 71 and 73.

Point B is coupled through a resistor 74 to a base input electrode of an automatic brightness control transistor 75. A collector output electrode of transistor 75 is coupled to the base electrode of transistor 85 through a current determining resistor 78 and resistor 82. An intermediate point C of voltage divider 70 is coupled to a base input electrode of an automatic contrast control transistor 87. A collector output of transistor 87 is coupled through a resistor 89 and a base-emitter junction of transistor 90 to circuit point A, and to the base of current source transistor 47.

Potentiometer 62 is pre-set so that under normal operating conditions, when beam current demand is sufficiently low such that beam current linmiting is not required, a control voltage appearing at point B of voltage divider 70 is insufficient to bias transistors 75 or 87 into conduction.

Voltage divider 70 serves to delay the conduction of transistor 87 relative to the conduction of transistor 75 in the presence of excessive beam currents. When beam current demand produces a voltage at the wiper of potentiometer 62 representative of a first range of beam currents in excess of a first threshold level, a proportional control voltage appears at point B of voltage divider 70. This voltage is of a magnitude to render transistor 75 conductive. By virtue of the voltage divider action of resistors 71 and 73, however, a proportional voltage then appearing at point C remains insufficient to render transistor 87 conductive.

The increased conduction of transistor 75 causes the collector voltage of transistor 75 to decrease in response to the voltage appearing at point B. This collector voltage causes a corresponding reduced voltage to appear at the base and also at the emitter of transistor 85 via resistors 78 and 82. The collector current of transistor 46 remains unchanged since this current is determined by the current supplied from source transistor 47, and the latter current remains unchanged at this time. Therefore, the voltage drop across resistor 49 due to the collector current of transistor 46 remains unchanged, so that the collector voltage of transistor 46 is reduced by the same amount that the base and emitter voltages of transistor 85 are reduced. The D.C. level of the luminance signal appearing at the collector of transistor 46 therefore is reduced by the same amount. This reduction in D.C. level is in a direction to reduce the brightness of a reproduced image to oppose excessive levels of beam current within the first range.

When beam current demand subsequently exceeds a second threshold level, greater than the first threshold level and beyond the first range, a proportional voltage then appearing at point C of voltage divider 70 is of sufficient magnitude to bias transistor 87 into conduction. Transistor 75 remains conductive at this time. However, at this time transistor 75 operates in a region of saturated conduction such that further increases in base bias do not produce a corresponding reduction in the collector control voltage of transistor 75. The saturation level of transistor 75 is determined by the value of current determining resistor 78 together with resistors 82 and 84. Thus in this example transistor 75 does not provide further brightness control beyond the second threshold level at which transistor 87 is rendered conductive. In this connection it is noted that resistor 74 serves to limit the base current of transistor 75 when in saturation, in order to prevent the base current of transistor 75 from upsetting the operation of voltage divider 70 together with transistor 87.

The increased conduction of transistor 87 in a second control range above the second threshold level causes the collector voltage of transistor 87 to decrease in response to the voltage at point C. This collector voltage causes a corresponding reduced voltage to appear at the bsse of transistor 47 via resistor 89 and the base-emitter junction of transistor 90. The current conduction of transistor 47 therefore decreases, causing a reduction in the signal gain of luminance amplifier 44 and therefore a reduction in the peak-to-peak amplitude of luminance signals appearing at the collector output of transistor 46. The reduction in the amplitude of the luminance signals is in a direcion to reduce the contrast of a reproduced image to oppose excessive levels of beam current in the second control range above the second threshold level.

It is noted that at this time a reduced voltage appearing at point A in response to the reduced collector voltage of transistor 87 is coupled to the control input of chrominance amplifier 35. This voltage serves to reduce the gain of amplifier 35 and thereby the peak-to-peak amplitude of the chrominance signals processed by amplifier 35.

The reduction of image contrast in response to beam current levels within the second range permits an additional measure of beam current limiting, while also rendering the beam limiting operation less noticeable to a viewer. If image brightness alone were controlled through the first and second control ranges, a reproduced image would appear to have excessive contrast during beam limiting operation within the second control range. Also, in a color television receiver, simultaneous control of the amplitudes of the luminance and chrominance signals during the second range of control renders the beam limiting operation less noticeable and therefore less objectionable during this time, since the amplitudes of the luminance and chrominance signals are preserved in desired relationship.

It is noted that in the illustrated embodiment, brightness has been described as being controlled in direct response to the voltage developed at the emitter of transistor 79 and the proportional voltage at junction point D. Brightness also can be controlled in accordance with a technique discussed in our copending U.S. patent application entitled, "Brightness Control Circuit Employing A Closed Control Loop", filed concurrently with this application and assigned to the same assignee as the present invention. More specifically, that technique employs a keyed differential comparator (not shown) coupled between points D and E. The comparator is supplied at a first input with a signal developed at point D as discussed, and at a second input with a color representative signal (e.g., B) from matrix 40. The comparator is keyed ON so as to sense the level of the "back porch" (approximately black level) of a sync interval of the video signal (e.g., with a burst gate) to develop an output control signal determined by the input signals applied to the comparator. The output signal is coupled to the base of transistor 85 through point E to control the D.C. level of the luminance signal.

What is claimed is:

1. In a system for processing an image representative video signal having a peak amplitude determinative of image contrast and a D.C. level determinative of image brightness, said system including a video signal transmission channel, and an image reproducing device for reproducing an image in response to video signals transmitted via said channel, current drawn by said image reproducing device being responsive to said peak amplitude and said D.C. level of said video signal, apparatus comprising:
    means for deriving a control signal representative of the magnitude of average current drawn by said image reproducing device; and
    means for coupling said control signal to said signal transmission channel for varying said D.C. level in a direction to limit said current above said threshold level when said current exceeds a predetermined threshold level by an amount within a first range of current, and for varying said peak amplitude in a direction to limit said current above said threshold level when said current exceeds said threshold level by a relatively greater amount within a second range of current.

2. Apparatus according to claim 1, wherein:
    said system includes high voltage supplying means for providing operating potential for said image reproducing device; and
    said signal deriving means is coupled to said high voltage supplying means such that said derived control signal is representative of the magnitude of current drawn by said image reproducing device from said high voltage supplying means.

3. Apparatus according to claim 1, wherein said coupling means comprises:
    normally non-conductive threshold conduction means having an input coupled to said signal deriving means and an output coupled to said signal transmission channel.

4. Apparatus according to claim 3, wherein said coupling means comprises:
    first normally non-conductive threshold conduction means with an input coupled to said signal deriving means and an output coupled to said signal transmission channel for varying said D.C. level; and
    second normally non-conductive threshold conduction means with an input coupled to said signal deriving means an an output coupled to said signal transmission channel for varying said peak amplitude.

5. Apparatus according to claim 4, wherein said coupling means further comprises:
means for delaying the conduction of said second means relative to said first means in response to said control signals.

6. Apparatus according to claim 5, wherein said delaying means comprises:
a voltage divider coupled to said signal deriving means and having first and second terminals coupled to said inputs of said first and second means, respectively.

7. Apparatus according to claim 6, wherein:
said first conduction means includes a first controllable conduction device with an input coupled to said first terminal and an output coupled to said signal transmission channel, said output providing a first control signal representative of the magnitude of said current within said first range; and
said second conduction means includes a second controllable conduction device with an input coupled to said second terminal and an output coupled to said signal transmission channel, said output providing a second control signal representative of the magnitude of said current within said second range.

8. Apparatus according to claim 7, wherein:
said first device is operative to provide said first control signal substantially only during said first range of current.

9. In a television signal processing system including a luminance channel for processing a luminance component of said television signal, an image reproducing device and high voltage supply means for providing operating potential for said image reproducing device, apparatus comprising:
means for deriving a control signal representative of the magnitude of average current drawn by said image reproducing device from said high voltage supply means;
first means for coupling said control signal to said luminance channel when said current exceeds a predetermined threshold level by an amount within a first range of current, for varying the D.C. level of said luminance component in a direction to limit current above said threshold level; and
second means for coupling said control signal to said luminance channel when said current exceeds said threshold level by a relatively greater amount within a second range of current, for varying the peak amplitude of said luminance component in a direction to limit said current above said threshold level.

10. In a system for processing a color image representative television signal, said system including a chrominance channel for processing a chrominance component of said television signal, a luminance channel for processing a luminance component of said television signal, and a kinescope for reproducing a color image in response to television signals coupled via said chrominance and luminance channels, a kinescope beam current limiter comprising:
means for deriving a control signal representative of the magnitude of average current drawn by said kinescope;
first means for coupling said control signal to said luminance channel when said current exceeds a predetermined threshold level by an amount within a first range of current, for varying a D.C. level of said luminance component in a direction to limit said current above said threshold level; and
second means for coupling said control signal to said luminance channel and to said chrominance channel when said current exceeds said threshold level by a relatively greater amount within a second range of current, for varying the gain of said luminance and chrominance channels, and thereby peak amplitudes of said luminance and chrominance components, in a direction to limit said current above said threshold level.

* * * * *